2 Sheets--Sheet 1.

B. KUHNS.

Seed-Planters.

No. 5,542. Reissued August 19, 1873.

Witnesses
H. Bradford
Wm. Crw. Inter

Benjamin Kuhns
Inventor
by
D. D. Mallory Atty
Atty

AM. PHOTO-LITHOGRAPHIC CO. N.Y. (OSBORNE'S PROCESS.)

2 Sheets--Sheet 2.

B. KUHNS.

Seed-Planters.

No. 5,542. Reissued August 19, 18 3.

Witnesses
N. Bradford
Wm. C. W. Stiles

Benjamin Kuhns
Inventor
by
D. P. Holloway Jr.
Atty.

AM. PHOTO-LITHOGRAPHIC CO. N.Y. (OSBORNE'S PROCESS.)

UNITED STATES PATENT OFFICE.

BENJAMIN KUHNS, OF DAYTON, OHIO.

IMPROVEMENT IN SEED-PLANTERS.

Specification forming part of Letters Patent No. 85,455, dated December 29, 1868; reissue No. 5,542, dated August 19, 1873; application filed June 20, 1873.

*To all whom it may concern:*

Be it known that I, BENJAMIN KUHNS, of Dayton, in the county of Montgomery and State of Ohio, have invented a new and useful Improvement in Seed-Drills; and I do hereby declare that the following is a full, clear, and exact description of the same, reference being had to the annexed drawings making a part of this specification, in which—

Figure 1:
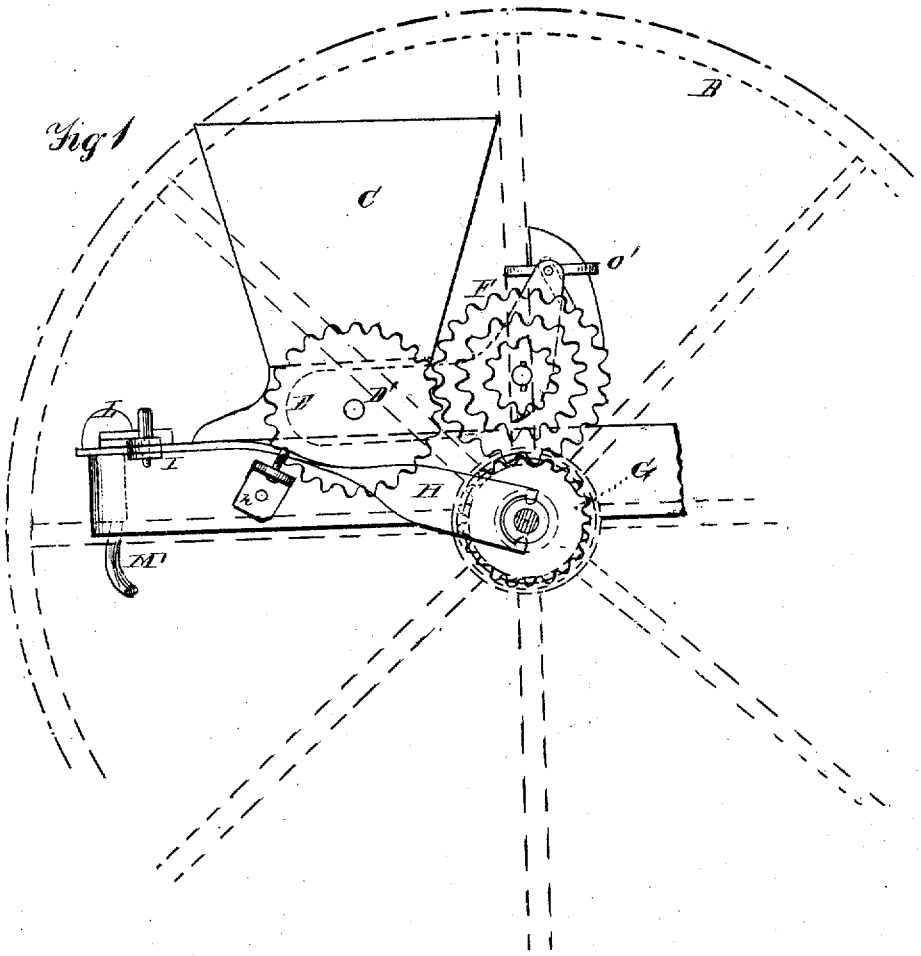
Figure 2:
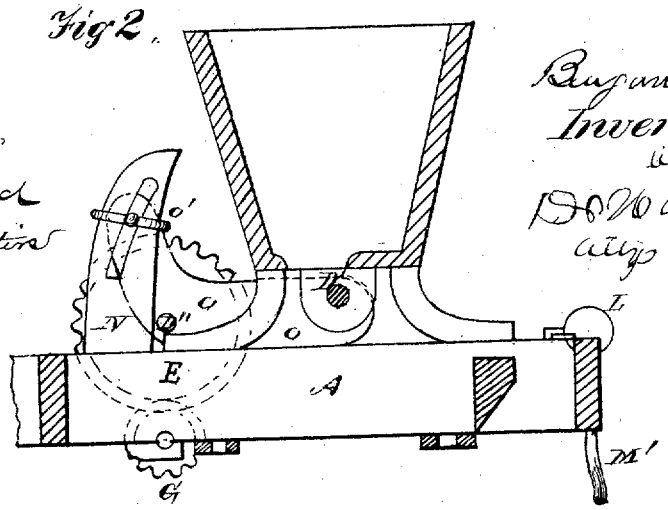
Figure 3:
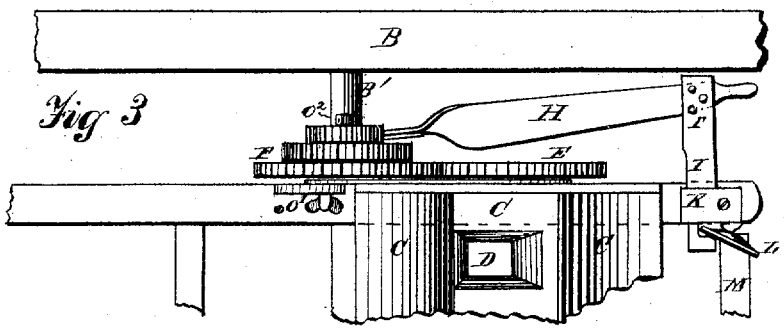
Figure 7:
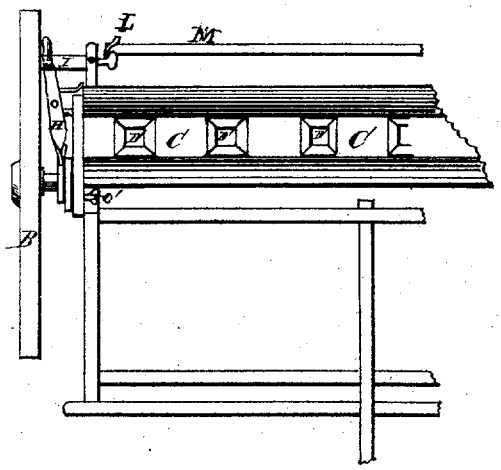
Figure 6:
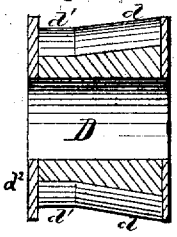
Figure 8:
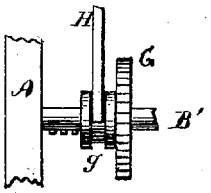
Figure 5:
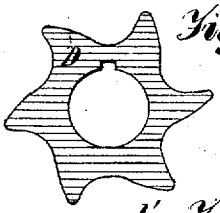
Figure 4:
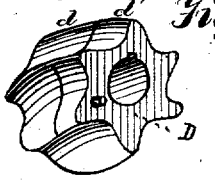

Figure 1 is a side elevation. Fig. 2 is a vertical longitudinal section. Fig. 3 is a top view. Fig. 4 is a perspective view of the pocketed roller. Fig. 5 is a section of the same. Fig. 6 is a side elevation of the same. Fig. 7 is a top view of the hopper, and Fig. 8 is an elevation of the shifting spur-wheel.

The same letters in all the figures indicate identical parts.

My improvements relate to the dropping mechanism of seeding-machines; and consist in a novel construction of the pocketed rollers, and also in the manner of constructing the gearing for giving different degrees of motion to the seeding mechanism, and in combining it with other parts of the machine, as will be more fully explained hereinafter.

In the annexed drawings, A represents the frame of an ordinary seed-drill carried upon two wheels, B, one turning upon the spindles of the axle B′, and the other keyed to the axle so as to cause the latter to rotate with it, within suitable boxes attached to the frame. C is the hopper in common use, in which the seeds to be sowed are deposited. It has holes in the bottom, in the usual manner, out of which the seeds are fed by the pocketed rollers D placed upon the shaft D′, in a manner in common use. The construction of these pocketed rollers is peculiar. They have been heretofore constructed with ribs running straight in the direction of their axes, forming the partition between the pockets. They have also been constructed with spiral ribs. The peculiarity of construction adopted by me is that I make the rib spiral for part of its length, at $d$, and straight for the remainder, as at $d^1$, by which means I am enabled to secure the advantages of a spiral rib, and avoid the objection of its serving as a screw to press the grains against the heads $d^2$, and thus crush and injure them. My improved roller, then, consists in constructing the pockets with solid heads $d^2$, and partitions part spiral and part straight. The seeds are dropped into tubes in the ordinary manner. The seeding-rollers are caused to revolve by the spur-wheel E, connected by the intermediate cone-pinion F with the driving-wheel attached to the axle B′ by a feather, which permits the said wheel G to be moved freely into or out of gear with the intermediate pinion by means of a shifting-lever, H. This lever is bifurcated, having points fitting into an annular groove, $g$, on the sleeve of the driving-pinion G, so that by shifting the lever the said pinion may be thrown out of or into gear. The lever H is pivoted to a point, $h$, on an arm extending from and securely fastened to the main frame. The end of the lever is passed through a slot in the sliding bar I, and adjustably attached by a pin passing through one of a series of holes, I′. By fixing the end of the lever H farther from or nearer to the frame of the machine, the distance to which it will move the sliding pinion G along the axle is correspondingly regulated, for a purpose to be hereinafter explained. One mode of operating the shifting-bar I, I have shown. A helical plate, L, is set with its edge in a notch in the edge of the bar I. The plate is centrally placed upon a rod or beam, M, which may be turned on its axis by the lever M′. By raising or lowering this lever the helical plate L will cause the bar I to slide in its bearings in the plate K, and thereby move the pinion G upon the axle to a point to be determined by the hole I′, to which the shifting-lever H is attached. It is desirable to give to the pocketed rollers such a motion as the condition and quality of the grain or character of the work to be done may require. This variable speed has been sometimes obtained by means of a series of separate pinions of several sizes, which fact has made it necessary that the machine should be stopped and a wheel of a certain size removed, and one of greater or less diameter put in its place every time that the motion of the seed-wheels was changed, so as to sow or drop more or less grain with a given advance of the machine, in which respect mine differs from all that have gone before it, in that in it the changes can be made without removing any of the wheels.

In certain corn-planters the speed of the dropping mechanism could be changed without the substitution of new parts, but such machines were entirely different in organization from the machines used for drilling small grain, and no other features existed in common. I am also aware that cone-pulleys have been used in broadcast sowers for giving a variable motion to the seed-scatterers, but the other parts of the organization of these machines were different; they were made to be carried on an ordinary farm-wagon, and the pulleys formed a part of a complex mechanism not found in my machine, in which combinations not shown in any of the devices above alluded to are made. In this case I use an intermediate cone-pinion, F, composed of a series of wheels cast on one hub, having a uniform pitch and of different diameters, forming a cone of, say, four, more or less, wheels, all turning upon the same axis, and cast in one piece or permanently attached to a single sleeve. In order that any of these wheels may be made to mesh into the driving-pinion G, the intermediate cone-pinion F is attached so as to turn upon a stud-pin projecting from the face of the oscillating arm O, turning upon the shaft D′, which is the shaft of the wheel E. The larger of the progressive series of wheels is geared into the spur-wheel E, and, as the latter has a common center with the center of oscillation of the arm O, it follows that the intermediate cone-pinion may be raised or lowered without affecting the mesh of the cogs. The arm O is attached at its front end adjustably by a set-screw, O′, working on a wrist-pin projecting from the face of the said arm, and passing through a curved slot in the standard N permanently and securely bolted to the main frame. As the main frame and the pinion G have a common center of oscillation and rotation, viz., the axle B′, it follows that any of the series of intermediate pinions will mesh into the cogs of the driving-pinion G. Thus, by raising or lowering the oscillating arm O, either of the intermediate cone-pinions F may be made to mesh both into the pinion G and spur-wheel E, and by adjusting the lever H in one of the holes I′ the throw of the pinion G may be regulated in reference to the pinion in the cone which is to be used.

It will be seen that, by combining the mechanism for giving the variable motion to the seed-wheels with the shaft which carries said wheels and with the driving-wheel, the change in the quantity of grain sowed or dropped on any given area of ground over which the machine passes can be evenly regulated.

What I claim as my invention, and desire to secure by Letters Patent, is—

1. The rollers D, constructed with pockets formed by fixed heads $d^2$, and intermediate partitions formed by ribs, part spiral and part straight, substantially as set forth.

2. In a grain-drill, in combination with the shaft D′, carrying the seed-distributing wheels and a shaft, B′, parallel thereto, and rotated by one of the carrying-wheels, intermediate mechanism adjustable without removal from the machine for communicating a variable movement to the grain-distributing wheels, while the speed at which the machine is moved forward is unchanged.

3. In combination with the spur-wheel on the hub or axle and the spur-wheel on the seed-roller, an intermediate set of pinions concentric with one another, so as to form a cone spur-pinion, so arranged as to give a variable speed by shifting the wheels in relation to one another, substantially as set forth.

4. The combination of the cone-wheel, the oscillating arm, and sliding pinion, arranged, in relation to one another, substantially as set forth.

5. The combination of the shifting-lever H, the sliding pinion G, and cone-pinion F with the feed mechanism of a grain-drill, substantially as set forth.

In testimony whereof I have signed my name to this specification in the presence of two subscribing witnesses.

BENJAMIN KUHNS.

Witnesses:

GEO. M. YOUNG,

LUTHER INGERSOLL.